United States Patent
Govyadinov et al.

(10) Patent No.: US 6,835,947 B2
(45) Date of Patent: Dec. 28, 2004

(54) EMITTER AND METHOD OF MAKING

(75) Inventors: Alexander Govyadinov, Corvallis, OR (US); Michael J. Regan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 10/066,158

(22) Filed: Jan. 31, 2002

(65) Prior Publication Data

US 2003/0141494 A1 Jul. 31, 2003

(51) Int. Cl.⁷ ............................................. H01L 29/06
(52) U.S. Cl. ...................................... 257/10; 313/310
(58) Field of Search ........................................ 257/10

(56) References Cited

U.S. PATENT DOCUMENTS

| | | | |
|---|---|---|---|
| 4,923,421 A | 5/1990 | Brodie et al. .................. 445/24 |
| 5,142,184 A | 8/1992 | Kane .......................... 313/309 |
| 5,374,844 A | 12/1994 | Moyer ........................ 257/582 |
| 5,507,676 A | 4/1996 | Taylor et al. ................. 445/50 |
| 5,528,103 A | 6/1996 | Spindt et al. ................ 313/497 |
| 5,557,596 A | 9/1996 | Gibson et al. ............... 369/101 |
| 5,559,342 A | * 9/1996 | Tsukamoto et al. ........... 257/10 |
| 5,760,417 A | 6/1998 | Watanabe et al. ............. 257/11 |
| 5,861,707 A | * 1/1999 | Kumar ........................ 313/309 |
| 6,011,356 A | 1/2000 | Janning et al. ........... 315/169.4 |
| 6,023,124 A | 2/2000 | Chuman et al. ............. 313/310 |
| 6,033,924 A | 3/2000 | Pack et al. .................... 438/20 |
| 6,313,043 B1 | 11/2001 | Hattori ........................ 438/745 |
| 6,577,057 B1 | * 6/2003 | Yamamoto et al. ......... 313/495 |

FOREIGN PATENT DOCUMENTS

WO    WO01/80273 A1    10/2001    ............. H01J/7/18

* cited by examiner

*Primary Examiner*—Douglas Wille
(74) *Attorney, Agent, or Firm*—Timothy F. Myers

(57) ABSTRACT

An emitter includes an electron source and a cathode. The cathode has an emissive surface. The emitter further includes a continuous anisotropic conductivity layer disposed between the electron source and the emissive surface of the cathode. The anisotropic conductivity layer has an anisotropic sheet resistivity profile and provides for substantially uniform emissions over the emissive surface of the emitter.

7 Claims, 11 Drawing Sheets

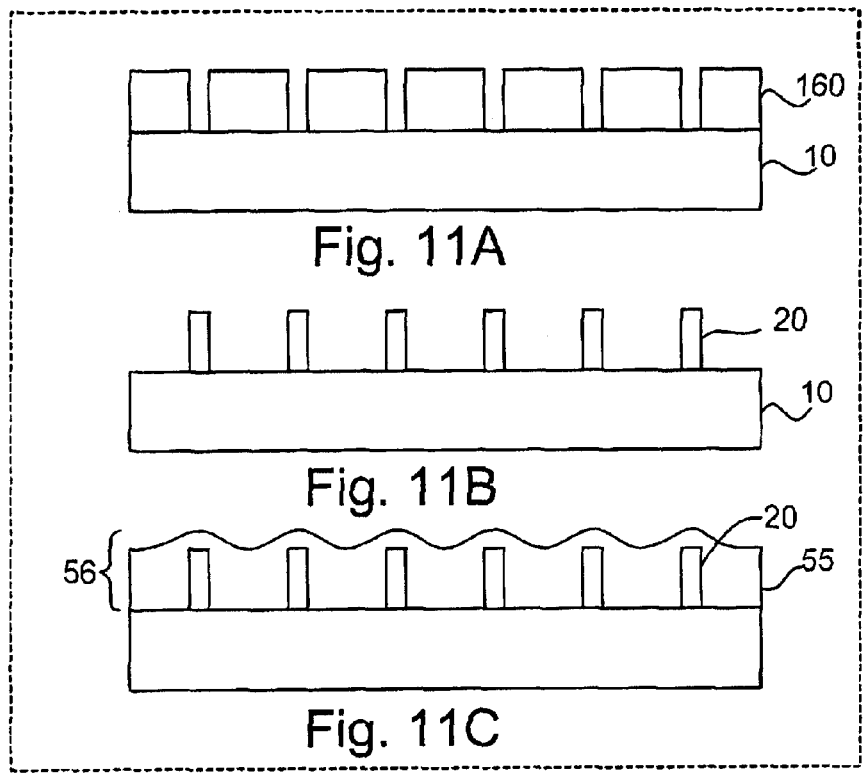
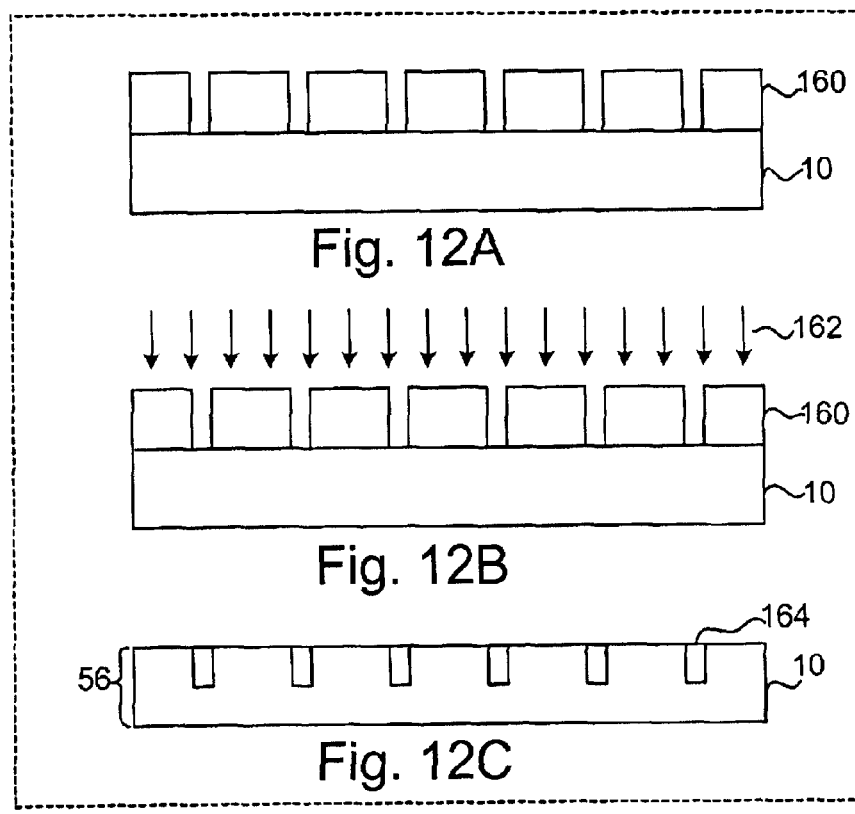

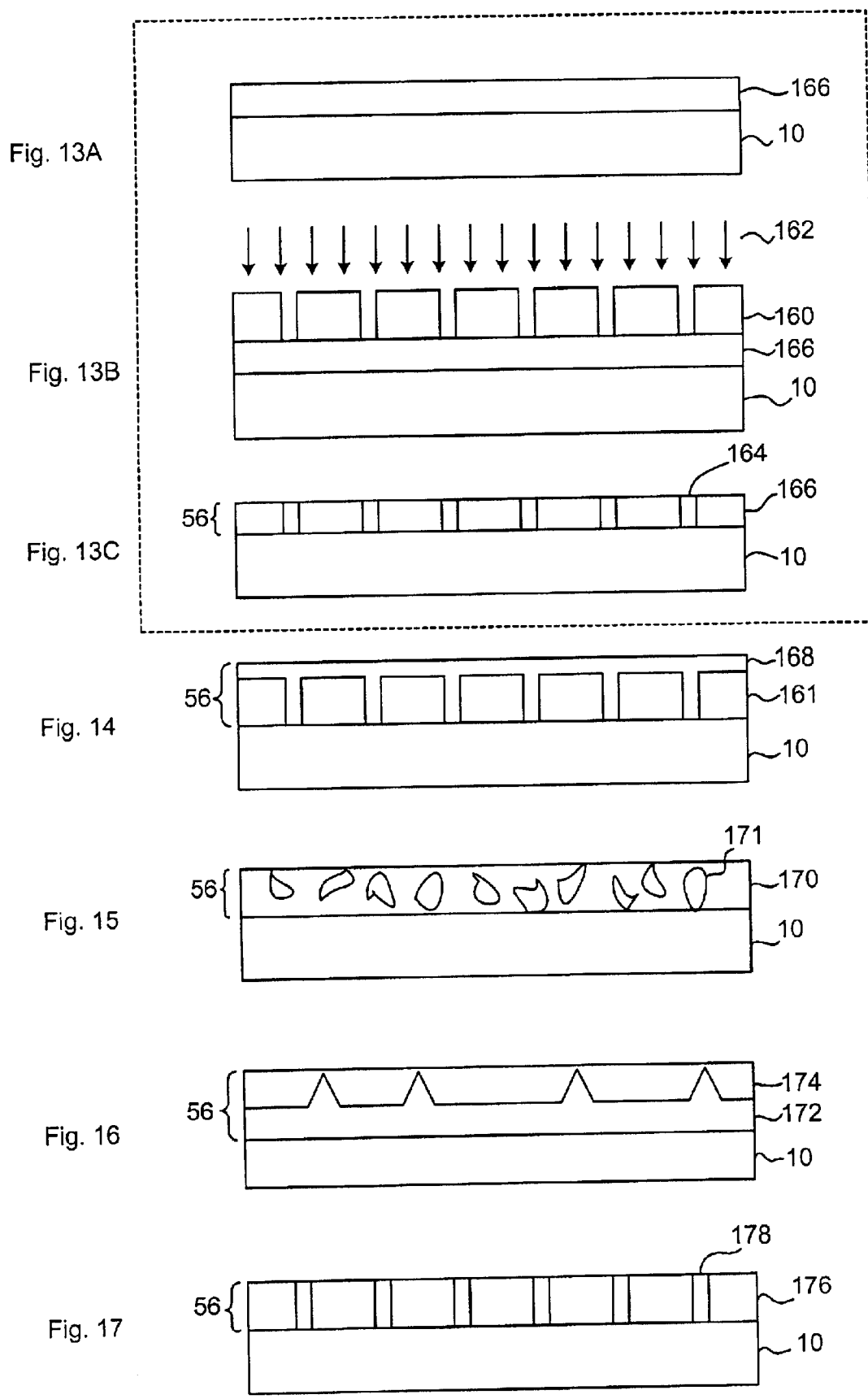

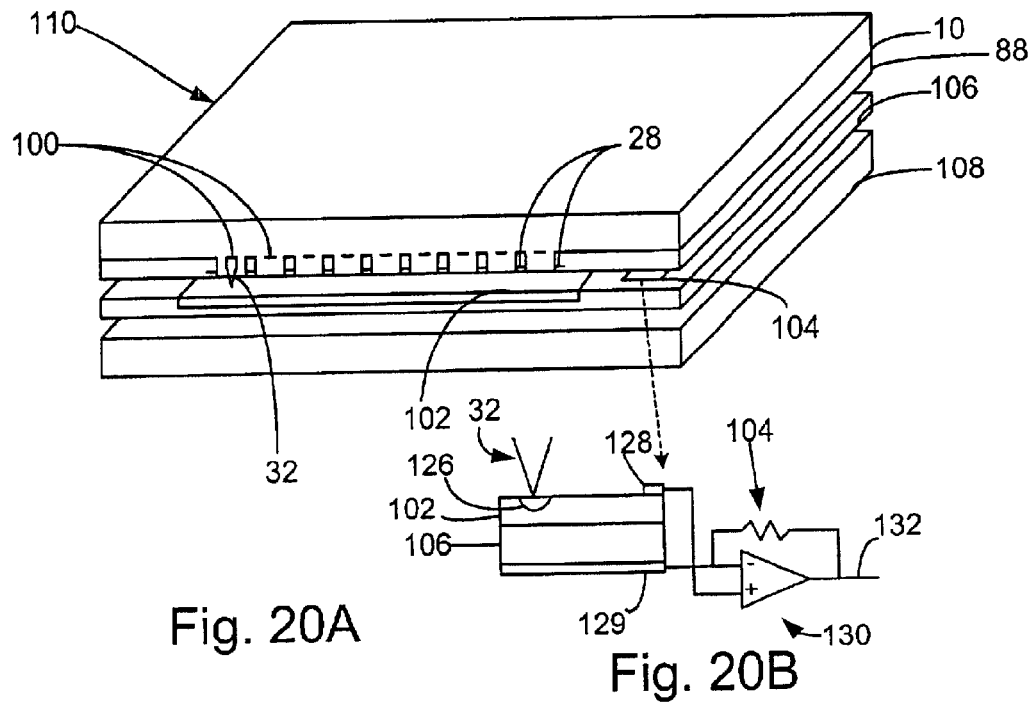
Fig. 20A
Fig. 20B
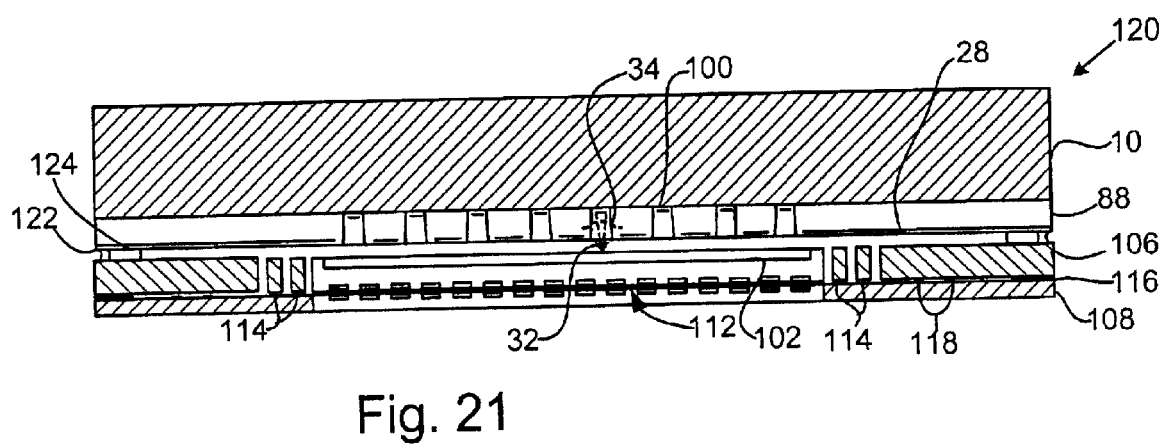
Fig. 21

EMITTER AND METHOD OF MAKING

BACKGROUND OF THE INVENTION

Computing technology continues it long term trend of becoming less expensive while providing more capability in terms of speed, storage density, and display pixel density. However, this trend may not continue. To allow computing technology to continue to provide more capability, peripheral devices such as mass storage devices and display devices must continue to advance. Hard disk drives, for example, have been able to increase the storage density tremendously over the last decade but are now encountering physical limitations that prevent further progress in density. Moreover, criticism has been voiced in the trade press about the inability of manufacturers of mass storage devices (such as disk drives, CD-ROMs, and DVD drives) to increase the data rate inline with the advancing speed of the microprocessors thereby limiting the system performance of such electronic devices as personal computers. In addition, although some hard disk drives have been miniaturized to operate with portable devices, their high power requirements still limit long-term battery operation. A higher data rate, more energy efficient, and high-density storage device is needed.

Users continue to insist on higher density display devices such as LCD panels and cathode ray tubes. Increasing the pixel resolution requires faster data rates to the display device because the display must be refreshed at the same rate as previous low density displays in order to prevent unwanted display flicker. In addition, display devices, such as LCD monitors have had difficulty in fulfilling demand due to the complexity of manufacturing them with near-zero defects. Further, the use of passive LCD technology has required the addition of backlights to allow for viewing in different ambient light conditions. These backlights require additional power thereby further limiting long-term battery operation.

Cathode ray electron beam technology has been present for many years in consumer products such as television (TV) tubes and computer monitors. These devices use what is known as 'hot cathode' electrodes to create a source of electrons that are directed to and focused on the viewing screen. While research has taken place in a number of new technological fields, the field of 'cold cathode' electron emitters such as Spindt-tips and flat emitters has attracted the attention of many manufacturers.

Several problems exist in converting this cold cathode technology into useful products. In general, electron beams need to: deliver sufficient current; be efficient; operate at application-specific low voltages; be focusable; be reliable at required power densities; and be stable both spatially and temporally at a reasonable vacuum for any given application. It has been difficult to achieve high current density, stability and reliability in one cold cathode architecture. For instance, a conventional flat tunneling emitter was reported to have an emission current density of only 0.1 to 1.00 mA/centimeter squared with an efficiency of less than 0.1 percent.

For example, while Spindt tips can provide both spatial and temporal stability and reliability, they can only do so while in a relatively strong vacuum greater than that of outer space thereby making their practical use difficult to achieve. Further, a Spindt tip is relatively difficult to focus compared to flat emitters.

One problem in creating stable and reliable flat emitters is that manufacturing defects or slight deviations in film thickness can easily cause damage to the emission surface due to "beetle gallery" formations once the emitter is operated at high emission levels. For instance, metal-insulator-metal (MIM) and metal-insulator-semiconductor (MIS) tunneling emitters tend to have much higher flickering and beetle gallery defects when operating at high emission levels. The beetle gallery defects tend to reduce the lifetime of the devices by causing fast aging and ultimate failure (usually shorts) of the device as this effect shifts from one emission center on the emitter surface to another as the emission sites fail.

If these problems persist, it will be unpractical to use cold cathode technology in multiple applications that require high speed, low power, and a high density of emitting devices such as with mass storage and display devices used in electronic devices.

SUMMARY OF THE INVENTION

An emitter includes an electron source and a cathode. The cathode has an emissive surface. The emitter further includes a continuous anisotropic conductivity layer disposed between the electron source and the emissive surface of the cathode. The anisotropic conductivity layer preferably has high conductivity emission sites distributed within a low conductivity layer to provide for substantially uniform emissions of all emission sites over the emissive surface of the emitter.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar though not necessarily exact parts through the several views.

FIGS. 8A and 8B are representative schematics of the operation of the embodiments shown in FIGS. 7A and 7B, respectively.

FIGS. 11A–C are exemplary process steps used to create one embodiment of the anisotropic conductivity layer.

FIGS. 12A–C are exemplary process steps used to create an alternative embodiment of the anisotropic conductivity layer.

FIGS. 13A–C are exemplary process steps used to create an alternative embodiment of the anisotropic conductivity layer.

FIG. 14 is an exemplary fabrication of an anisotropic conductivity layer that incorporates the invention using templated resistive material.

FIG. 15 is an alternative exemplary fabrication of an anisotropic conductivity layer that incorporates the invention using material having a self-aligned array.

FIG. 16 is an alternative exemplary fabrication of an anisotropic conductivity layer that incorporates the invention using an artificially created array.

FIG. 17 is an alternative exemplary fabrication of an anisotropic conductivity layer that incorporates the invention using sputtered columns of material within a deposited resistive material.

FIGS. 20A and 20B are an exemplary embodiment of the invention incorporated into a conceptual mass storage device.

FIG. 21 is an exemplary embodiment of the invention incorporated into an integrated mass storage device.

DETAILED DESCRIPTION OF THE PREFERRED EMBODIMENT

Figure 1:
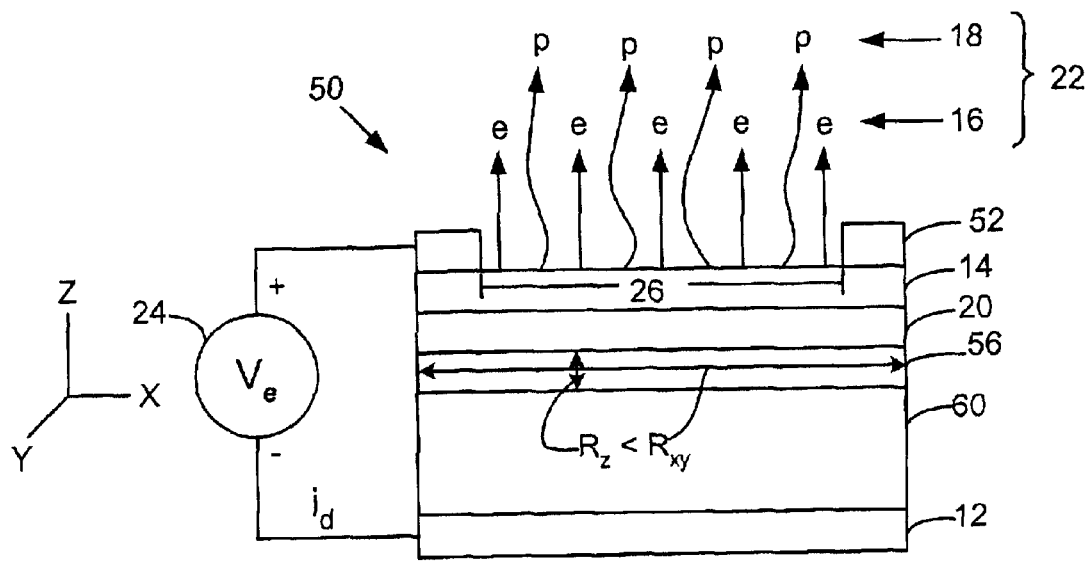
FIG. 1 is an exemplary embodiment of a generic emitter that incorporates the invention.

The invention allows for the design and manufacture of a highly efficient electron emitter that is also capable of emitting photons. The process design is compatible with conventional semiconductor fab processes and equipment thereby allowing for low cost implementation and scalability for mass production. The invention incorporates an "anisotropic conductivity layer" between an electron source of the emitter and the emissive surface of the emitter, also known as the cathode. The invention allows for increased emission current, efficiency, lifetime, and stability while reducing flicker. The invention improves both field emission devices; such as cold cathode spindt tip type emitters, and tunneling devices, such as MIS or MIM flat emitters. The invention allows for a self-biased array of nano to micro-sized emission sites. Further, the invention can improve manufacturability of the emitters by allowing for the removal of some high temperature processes such as field oxide or thermal oxide growth baking used with previous designs to create emitters.

The anisotropic conductivity layer provides either a self or artificially assembled array of nano or micro scaled emission sites with a serial back resistance that connects to each single emission site. By such a connection scheme, each emission site is regulated to provide self-consistent operation over the cathode surface. The emission sites can be spontaneously created using locally thinner dielectric, micro or nano sharpened conductive tips buried within or formed outside of tunneling dielectrics, or an artificially created conductive channel array. The serial back resistance is preferably obtained by choosing a suitable thin-film material of the appropriate resistivity to act as an "anisotropic conductivity" distributed resistor in series with the emissive sites. The anisotropy exists in the conductivity, electric field, and therefore the resistivity. By using an anisotropic conductivity material within varying electric fields, the resistivity of the material in a particular direction is approximately inversely proportional to the electric field in that direction. This inverse proportionality is similar in the relation between the resistivity and the voltage applied across the material in the direction of the resistivity. It is also possible that a material may have non-linear resistivity, such as with doped semiconductor junctions (i.e. diodes, transistors). In this case of non-linear resistivity, the resistance is inversely proportional to exponential of the electric field or voltage applied across the resistive material.

Several different methods can be used to create an anisotropic conductivity layer. One approach is to simply use a three-dimensional resistive layer that has an anisotropic (non-uniform) conductivity between the thickness of the material (hereby referenced as the z-direction) and the plane of the material (hereby referenced as the xy-direction or length and width of the material). When choosing such a material, it is preferable that the conductivity in the z-direction be greater than the conductivity in the xy-direction. Another way to state the desired material property is that the resistance in the thickness is less than the resistance in the length and width directions. Preferably, the ratio of conductivity in the z-direction is between the range of about 2 to about 10 times the conductivity in the xy-direction. An exemplary chosen sheet resistivity for the z-direction is about $1 \times 10^7$ to about $1 \times 10^{10}$ Ohms cm such as can be found with undoped poly-silicon.

Other possible anisotropic conductivity layer implementations include: using a deposited resistive layer in dielectric template; a self-assembled granulated material such as poly silicon; a noduled resistive material; a material that incorporates columned structures, such as sputtered or chemically vapor deposited materials such as silicon or diamond like carbon; micro-patterned resistive channels, such as patterned doped silicon; patterned and/or structured epitaxial semiconductors; or creating forward biased p-n junctions within resistive materials or the electron source. These embodiments and others will be described in more detail as examples of how to implement and use the invention. Other techniques may become apparent to those skilled in the art in the following detailed description of preferred and alternative embodiments of the invention and still fall within the scope and spirit of the invention such as nano-protrusions and quantum dots that ultimately lead to single atom emission.

For instance, the electron emitters described within are preferably fabricated with semiconductor device technology. However, the devices of the present invention are applicable to a broad range of semiconductor devices technologies and can be fabricated from a variety of semiconductor materials. The following description discusses several presently preferred embodiments of the semiconductor devices of the present invention as implemented in silicon substrates, since the majority of currently available semiconductor devices are fabricated in silicon substrates and the most commonly encountered applications of the present invention will involve silicon substrates. Nevertheless, the present invention may also advantageously be employed in gallium arsenide, germanium, and other semiconductor materials or conductive substrates. Accordingly, the present invention is not intended to be limited to those devices fabricated in silicon semiconductor materials, but will include those devices fabricated in one or more of the available semiconductor materials and technologies available to those skilled in the art, such as thin-film-transistor (TFT) technology using polysilicon on glass substrates.

It should be noted that the drawings are not true to scale. Further, various parts of the active elements have not been drawn to scale. Certain dimensions have been exaggerated in relation to other dimensions in order to provide a clearer illustration and understanding of the present invention.

In addition, although the embodiments illustrated herein are shown in two-dimensional views with various regions having depth and width, it should be clearly understood that these regions are illustrations of only a portion of a device that is actually a three-dimensional structure. Accordingly, these regions will have three dimensions, including length, width, and depth, when fabricated on an actual device. Moreover, while the present invention is illustrated by preferred embodiments directed to active devices, it is not intended that these illustrations be a limitation on the scope or applicability of the present invention. It is not intended that the active devices of the present invention be limited to the physical structures illustrated. These structures are included to demonstrate the utility and application of the present invention to presently preferred embodiments.

FIG. 1 is an illustration of an embodiment of the invention shown as a generic emitter. An emitter 50 has an electron supply 60 and a cathode 14. Disposed between the cathode 14 and the electron supply 60 is preferably either an organized or chaotic array of emission sites 20 and an anisotropic conductivity layer 56. The anisotropic conductivity layer 56 has a back resistance layer having a resistivity $R_z$ in the z direction that is less than the resistivity $R_{xy}$ in the x and y directions. Optionally, the emission sites 20 and the anisotropic conductivity layer 56 can be combined into a single anisotropic conductivity layer. If the emission sites 20 are fabricated separately from the anisotropic conductivity layer 56, such as with a field emission display, the anisotropic conductivity layer 56 can just incorporate the back resistance layer. The cathode 14 and the electron supply 60 are connected to an emitter voltage source 24 using a cathode contact 52 and supply contact 12, respectively. When operating, the emitter 50 causes a diode current Id to flow. A portion of the diode current is converted to energy emissions 22 in the form of emissions of electrons 16 and photons 18. The ratio of energy emissions 22 current to the diode current defines the efficiency of the emitter. One benefit of the invention is that by incorporating the anisotropic conductivity layer 56 between the electron source 60 and the cathode 14 the efficiency, lifetime, and signal to noise (flicker in particular) ratio of the emitter is increased.

The cathode contact 52 has one or more layers of conductive materials to make electrical and adhesive contact to the cathode 14. The cathode contact 52 is preferably etched to define an opening that exposes a portion of the surface of the cathode 14. The exposed portion of the cathode surface forms an emitter surface 26 that is capable of creating the energy emissions 22 in the form of electrons 16 and photons 18. Using the architecture of the invention, the emitting surface for flat tunneling emitters has an electron emission rate of about 2 to about 8.0 Amps per square centimeter with an efficiency of about 1 to about 8 percent (preferably at least 2 percent which is far greater than the 0.1 percent efficiency of conventional flat tunneling emitters) dependent on the actual design choices selected for the flat tunneling emitters that are fabricated. It is possible that even up to about 10 percent or more efficiency is seen for some architectures of flat tunneling emitters. It should be noted that most field emission devices (such as Spindt tips) can have efficiencies of about 100% due to the physical properties of those devices as they operate fundamentally different than tunneling emitters. By using an anisotropic conductivity layer, the rate of emissions over the surface of an array of field devices and tunneling devices will be more consistent and uniform than without the anisotropic conductivity layer. Also for tunneling devices, the anisotropic conductivity layer will help prevent defects from creating "beetle gallery" formations within the emission sites 20 that result in faster aging and failure due to a concentration of electrons in the defect site. By using the anisotropic conductivity layer, if a concentration of electrons occur, the back resistance of the anisotropic conductivity layer will increase the potential across other emission sites and limit the electron current flow to the defect, thus preventing the "beetle gallery."

Preferably the electron supply 60 is a heavily doped semiconductor substrate such as silicon or a conductive layer deposited on a non-conductive substrate. The doping is preferably n-type doping such as phosphorous, arsenic, or antimony. More preferably, the anisotropic conductivity layer 56 is designed to interface to the electron supply 60 to regulate the flow of electrons from the supply contact 12 to the emitter surface 26 such that the emission of electrons over the emitter surface 26 is substantially uniform.

Figure 2:
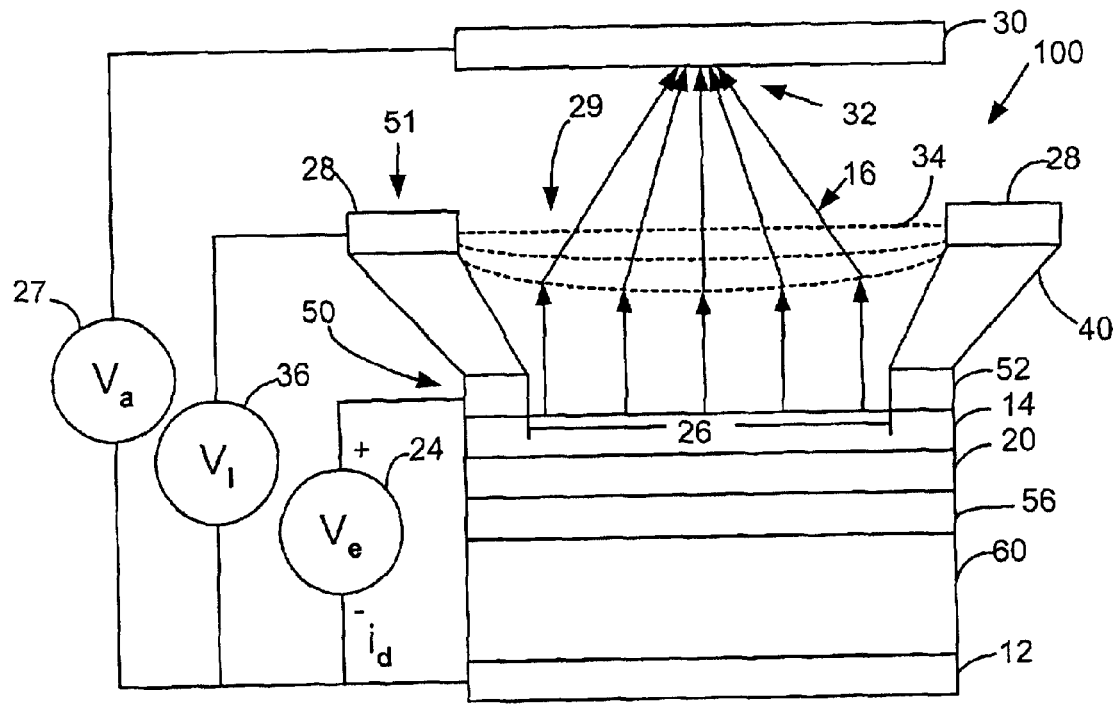
FIG. 2 is an alternative exemplary embodiment of the invention from FIG. 1 that further includes an electron lens.

FIG. 2 is an illustration of an alternative embodiment of the invention that builds upon the emitter 50 shown in FIG. 1. In this embodiment an electronic lens structure 51 is disposed on the emitter 50 to create an integrated emitter 100. The spacer layer 40 is disposed on the cathode contact 52 and is preferably made of a dielectric such as TEOS or other low temperature dielectric such as oxide that provides for minimal stress forces due to thermal cycling during processing. Disposed on the spacer layer 40 is an electron lens 28. The electron lens 28 has an opening 29 that allows an electric field 34 to form that is used to focus the beam of electrons 16 to create a focused beam 32 on an anode 30. To create the electric field 34, a lens voltage source 36 is connected to the supply contact 12 and the electron lens 28. An anode voltage source 27 is connected to the supply contact 12 and the anode 30. Preferably, the anode voltage source 27 is set at a predetermined voltage such that the electrons 16 are attracted to it.

Figure 3:
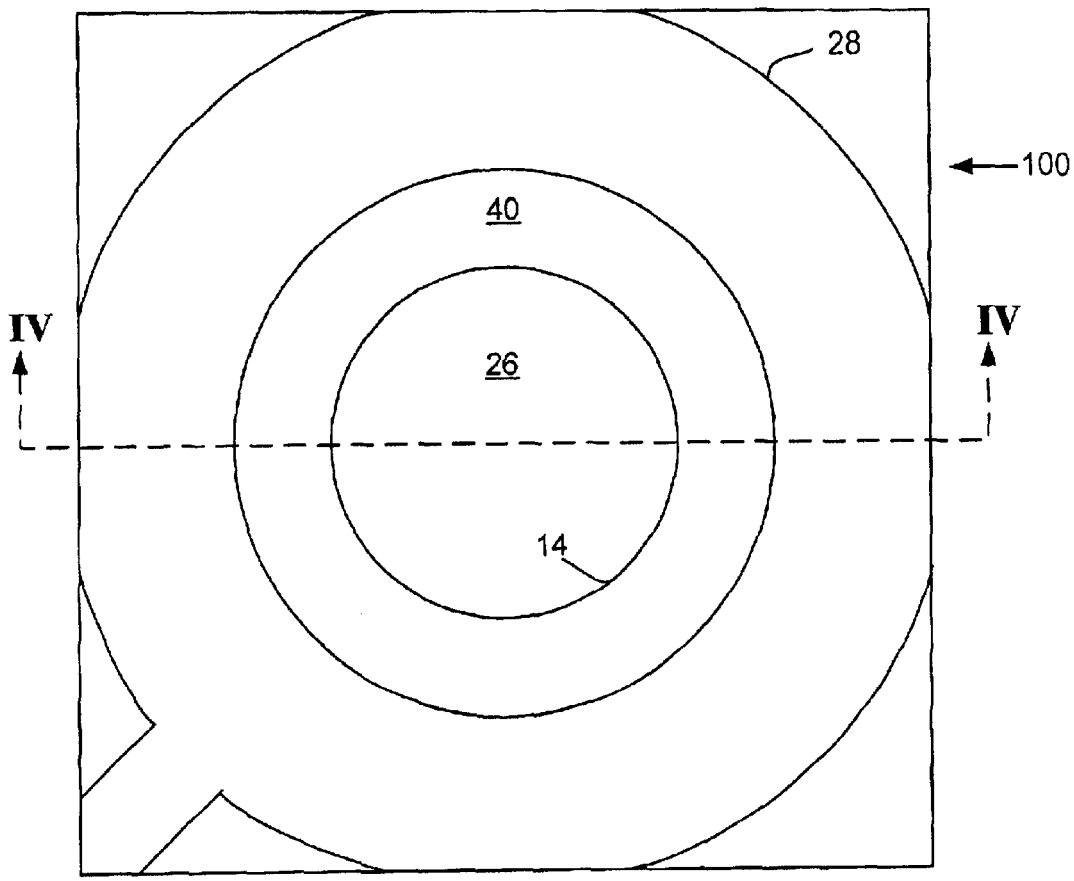
FIG. 3 is top view of an exemplary embodiment of the invention constructed using semiconductor thin film processing.

FIG. 3 is a top view illustration of an exemplary embodiment of an integrated emitter 100 that incorporates the invention. As shown, preferably the integrated emitter is of a circular shape to prevent inadvertent concentrations of electric fields. However, other shapes such as rectangular, octagonal, or other polygonal shapes are possible and still meet the spirit and scope of the invention. The integrated emitter 100 has an electron lens 28 having an opening that exposes a portion of the spacer layer 40 and emitter surface 26 of cathode 14.

Figure 4:
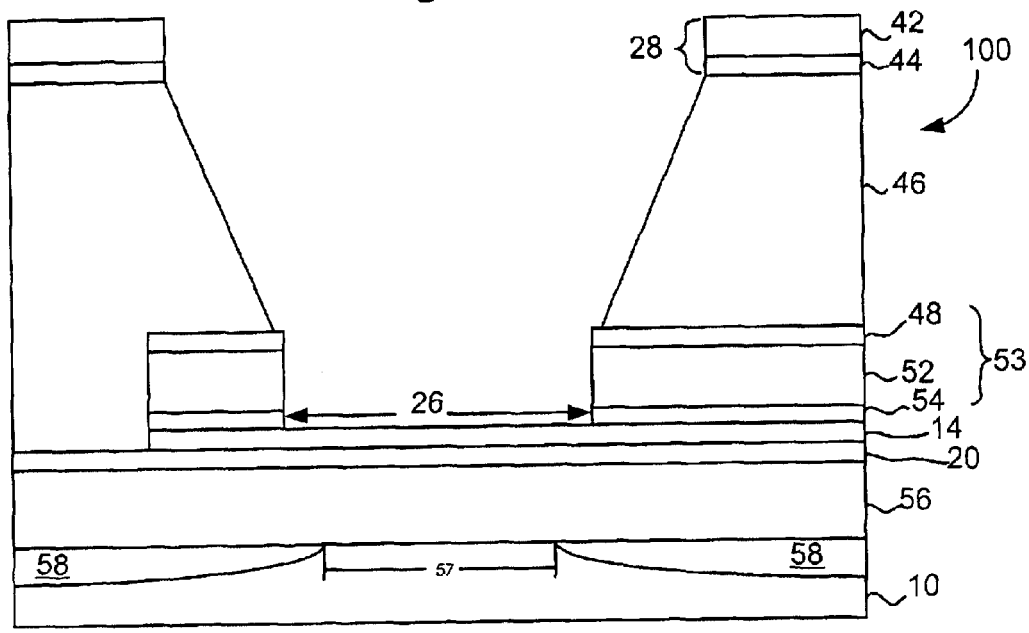
FIG. 4 is a cross-sectional view of the exemplary embodiment shown in FIG. 3.

FIG. 4 is a cross-section of the exemplary integrated emitter 100 of FIG. 3 taken along the IV—IV view. In this exemplary embodiment, the integrated emitter 100 is built upon a semiconductor substrate 10, preferably silicon that is also preferably heavily doped with n++ donors to provide an ample supply of electrons. Formed with or on the surface of substrate 10 is an emitter isolation layer 58. The isolation layer 58 is preferably made of field oxide (FOX) that is grown on substrate 10. Optionally, the isolation layer 58 can be a dielectric layer that is deposited or otherwise applied to substrate 10. Within the isolation 58 is an opening 57 that allows electrons to leave the substrate 10. An anisotropic conductivity layer 56 is deposited or otherwise created on the exposed surface of the substrate 10 and the isolation layer 58. Optionally, if not part of the anisotropic conductivity layer 56, an artificial or self organized or chaotic array of emissive sites 20 is created on the anisotropic conductivity layer. The substrate 10, the anisotropic conductivity layer 56, and emissive sites 20 form a uniform electron supply for this exemplary emitter. The anisotropic conductivity layer 56 and emissive sites 20 provide for substantially a uniform supply of electrons across the emitter surface 26.

Emission sites 20 and an anisotropic conductivity layer 56 are preferably unpatterned to minimize process contamination and extend across the surface of the processed substrate 10. Disposed on a portion of the emission sites 20 is a cathode 14, preferably gold, tantalum, or platinum and combinations thereof of a sufficient thinness to allow for electrons to escape from the emissive sites 20. Disposed on the cathode 14 is a cathode contact 52 that provides electrical and adhesive contact to the cathode surface. Defined within the cathode contact 52 is an opening to the cathode 14 that creates the emitter surface 26. The cathode contact 52 is preferably formed of multiple layers of conductive thin-film material such as tantalum, titanium or molybdenum to form a lens etch stop 48 and emitter etch stop 54. Disposed upon the cathode contact 52 and a portion of the emission sites 20 is a spacer layer 46 formed from a dielectric such as TEOS to a preferable thickness of about 5 microns. Disposed on the spacer layer 46 is an electrons lens 28 that is preferably formed of one more layers of conductors.

The isolation layer 58 is created preferably using a recessed field oxidation process (oxidation/etch/oxidation) to provide a better planar surface and to reduce birdsbeak at the FOX edge. The FOX thickness is preferably about 4500 Angstroms and the height from the FOX surface to the surface of the substrate 10 is about 200 Angstroms. Besides FOX, isolation layer 58 may be created by using deposition or thermal growth of other materials such as oxides, nitrides, and oxynitrides of silicon, aluminum, titanium, tantalum, tungsten, hafnium, zirconium, vanadium, niobium, molybdenum, chromium, yttrium, scandium, nickel, cobalt, beryllium, magnesium, diamond like carbon and combinations thereof.

Several different materials for substrate 10 that may be used include conductive and semiconductive materials such as aluminum, tungsten, titanium, copper, gold, nickel, tantalum, platinum, iridium, palladium, rhodium, chromium, magnesium, scandium, yttrium, vanadium, zirconium, niobium, silicon, beryllium, hafnium, silver, and osmium. The substrate may also be any alloys and multilayered films of the previously stated substrate materials. Other possible substrates include doped polysilicon, doped silicon, metallic suicides and carbides, graphite, metal-coated glass, ceramic, plastic, and indium-tin-oxide coated glass. The substrate material may be patterned or unpatterned. Conventional methods such as chemical-mechanical polishing (CMP) can planarize the top surface of the conductive substrate as required by a given application.

An anisotropic conductivity layer 56 is formed over the surface of the substrate and isolation layer 58 to substantially uniformly distribute electrons from the substrate to latter defined emission sites within the emitter surfaces. The anisotropic conductivity layer 56 is preferably formed using crystalline poly-silicon with a thickness of about 0.1 to 2 microns. The polysilicon can be optionally anodized or non-anodized. An anisotropic conductivity layer is formed when the polysilicon has a uniform surface but an anisotropic resistive profile in the z and x-y directions. The z direction is in regard to the polysilicon thickness. The x-y direction is in regard to the polysilicon length and width dimensions. The sheet resistivity of the anisotropic conductivity layer material in the thickness direction should be at least one-half the sheet resistivity of the anisotropic conductivity layer in the length and width directions. The sheet resistivity in the thickness direction is preferably about $1\times10^5$ to about $1\times10^{10}$ Ohm-centimeters at a zero electric field.

In one embodiment, a layer of amorphous polysilicon creates the layer of emission sites 20 that has multiple protrusions for creating localized high electric fields to enhance the electron emission forms. Other embodiments incorporate the emission sites 20 within the anisotropic conductivity layer 56. It is also possible to incorporate the anisotropic conductivity layer 56 and/or emission sites 20 within the electron source 60. The emission sites included in the anisotropic conductivity layer may be either a self-organized or chaotic array (formed by the process or material used) or and artificially assembled array (such as formed by patterned masks). By using an anisotropic conductivity layer 56 and a layer of emission sites 20 the emission rate, stability and reliability of the emitter are enhanced.

Preferably the layer of emission sites 20 is unpatterned to prevent defects from forming during processing. The emission sites 20 may be a tunneling layer that is deposited, grown, or otherwise applied to the substrate within the defined openings of the isolation layer. Preferably the layer of emission sites 20, when including a tunneling layer, is RTP grown oxide from the poly-silicon anisotropic conductivity to a thickness of about 50 to about 200 Angstroms. If using an RTP process for other than a poly-silicon anisotropic conductivity or electron supply layer layer, in order to have uniform oxide thickness and temperature control for the RTP process, a non-metal anisotropic conductivity layer 56 is required. Besides polysilicon, using deposition or thermal growth of other materials such as oxides, nitrides, and oxynitrides of silicon, aluminum, titanium, tantalum, tungsten, hafnium, zirconium, vanadium, niobium, molybdenum, chromium, yttrium, scandium, nickel, cobalt, beryllium, magnesium, diamond like carbon and combinations thereof may create a tunneling layer used for emission sites 20.

The cathode layer 14 is preferably formed from a deposition of about 100 Angstroms of platinum (Pt) or gold (Au). When using gold as the cathode layer 14, it is preferable to deposit up to about 10 Angstroms of tantalum before depositing a 50 to 100 Angstrom layer of gold. The tantalum layer is used to provide better adhesion of the gold to the tunneling layer and to prevent the gold from migrating into the tunneling layer. The cathode layer 14 will be placed at a positive potential relative to the electron source to create an electric field across the thickness of the layer of emission sites 20 to cause the electrons to tunnel through the tunneling layer and be pulled to the cathode layer 14 with sufficient velocity that some escape to form the energy emission 22. The emitted photons 18 are thought to be created by the electrons colliding into the cathode material thereby causing electron-phonon scattering and part of the energy loss is due to photon creation.

Besides platinum or gold other possible cathode layer 14 materials include aluminum, tungsten, titanium, molybdenum titanium, copper, silver, tantalum, iridium, palladium, rhodium, chromium, magnesium, scandium, yttrium, vanadium, zirconium, niobium, molybdenum, hafnium, osmium, other refractory metals and any alloys or multilayered films thereof. Other possible cathode surfaces include doped polysilicon, silicon, silicides, titanium nitride, graphite, or combination of metal and non-metal such as conductive carbon or other films. Preferably, the material chosen for cathode layer 14 does not oxidize to an insulating native oxide.

The lens etch stop layer 48 and emitter etch stop layer 54 is preferably created using a deposition of about 300 to about 1500 Angstroms but more preferably about 800 Angstroms of titanium (Ti) or molybdenum.

Besides titanium or molybdenum other possible protective layer materials useful for a sacrificial layer for an etch stop include aluminum, tungsten, molybdenum titanium, copper, silver, nickel, tantalum, iridium, palladium, rhodium, chromium, magnesium, scandium, yttrium, vanadium, zirconium, niobium, hafnium, osmium, and any alloys thereof.

The cathode contact 52 is preferably created using a deposition or plating of about 2000 Angstroms of gold (Au). This conductive layer forms the metal trace and electrically contacts to the cathode surface preferably through an adhesive layer to transform the electric field from the power supply to the emitter.

Several different dielectric films can be used for spacer layer 46, preferably a low temperature oxide, but the selection must consider interfilm stress and interfilm etch selectivity. If the stress between the spacer layer 40 and the processed substrate is too great the substrate may warp (especially when the substrate is conventional semiconductor silicon substrate). This warping can cause errors in the photo processes. Preferably for the thin-films previously selected, tetraethylorthosilicate (TEOS) film provides an acceptable low stress of less than about an absolute value of 100 mPascals or more preferably in the range of −40 to −60 mPascals for a 5 micron thick film. After depositing the spacer layer, it may be optionally planarized using conventional planarization processes in order to form a substantially flat surface for the electronic lens made with the conductive layer 42 of electron lens 28. Other spacer films include silicon dioxides, silicon nitrides and combinations thereof.

Conductive layer 42 is applied on the surface of the spacer layer 40. Optionally, an adhesion layer 44 may be applied first to provide a good interface between the spacer layer 40 and the conductive layer 42 (see FIG. 7O). Exemplary choices are about 500 Angstroms of deposited tantalum for the adhesion layer 44 and about 1000 Angstroms of deposited gold for the conductive layer 42. The conductive layer is etched, preferably with a dry or wet etch to define the lens geometry and optionally a partial shield layer used to prevent electrostatic attraction with an anode layer at a different potential than the electron lens.

Figure 5:
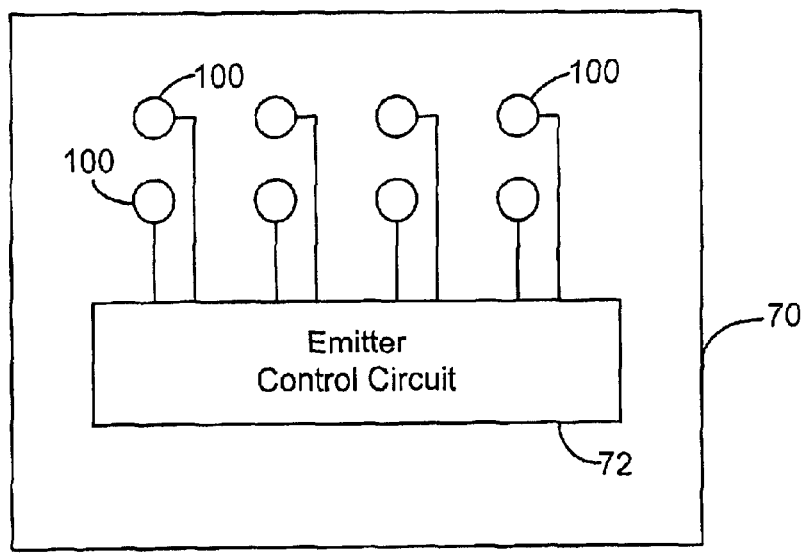
FIG. 5 is an exemplary embodiment of the invention incorporated into an integrated circuit with control circuitry.

FIG. 5 is an exemplary embodiment of the invention in the form of an integrated circuit 70 that has one or more integrated emitters 100 arranged in an array and controlled by emitter control circuitry 72. The emitter control circuitry allows for individual control of each integrated emitter 100. By controlling the thickness, shape, or characteristics of the layer of emission sites 20 and the anisotropic conductivity layer 56, the turn on voltage of the integrated emitters can be chosen such that the integrated circuit can be fabricated with conventional CMOS, BiCMOS, or custom CMOS/HVCMOS circuitry. By being able to use conventional semiconductor processes the cost is lowered and the ability to mass-produce combined emitters and circuitry is possible.

Figure 6:
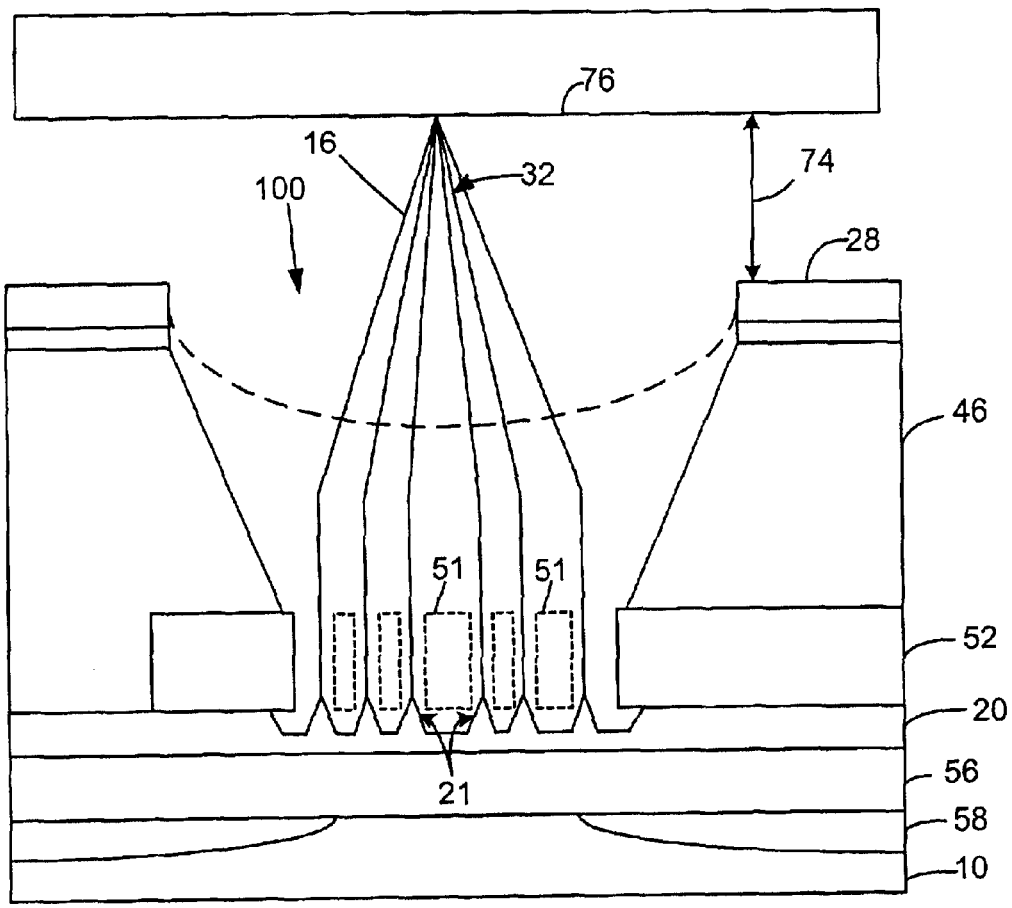
FIG. 6 is an exemplary embodiment of the invention wherein the electron emitter is comprised of a plurality of spindt tips with an optional grid structure.

FIG. 6 is another embodiment of an integrated emitter 100 that includes an anode surface 76, such as a display screen or a programmable media surface that is affected by the electrons 16 when they are preferably formed into a focused beam 32. The anode surface 76 is held at a predetermined distance, anode-lens spacing 74, from electron lens 28. In this embodiment the integrated emitter is shown fabricated with an anisotropic conductivity layer 56 and an emissive sites 20 layer that is created using an array of field emission devices such as Spindt tips 21. The cathode contact 52 may optionally include a grid 51 with an array of openings aligned with Spindt tips 21 to allow for the controlled emission of electrons.

Figure 7A:
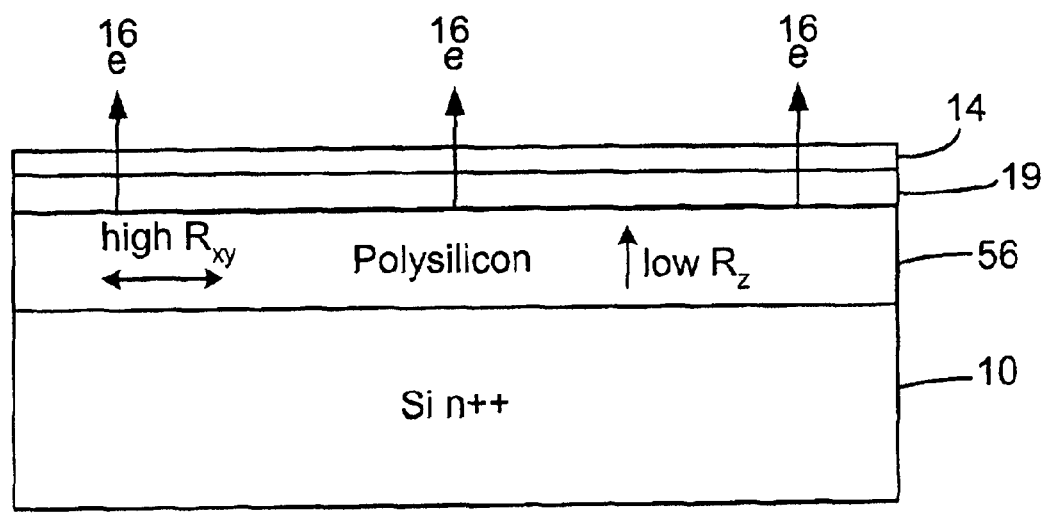
FIGS. 7A and 8A are exemplary embodiments of the invention illustrating methods of fabricating the anisotropic conductivity layer.

FIG. 7A is an exemplary embodiment of the invention illustrating one method of fabricating the anisotropic conductivity layer. In this embodiment the anisotropic conductivity layer 56 is made up of a layer of anisotropic conductive polysilicon that is deposited on substrate 10. Substrate 10 is preferably a heavy n++ doped silicon substrate. Deposited on the substrate 10 is anisotropic conductivity layer 56 made of polysilicon that is deposited or otherwise form such the sheet resistance in the thickness direction is less than the sheet resistance in the length and width directions. Deposited on the anisotropic conductivity layer 56 is a tunneling layer 19 formed of silicon dioxide or other dielectric to form tunneling sites. Deposited on the tunneling layer 19 is a cathode 14. Electrons 16 are emitted from the top surface of the emitter after tunneling through the tunneling layer 19 with sufficient momentum to escape the cathode 14.

Figure 7B:
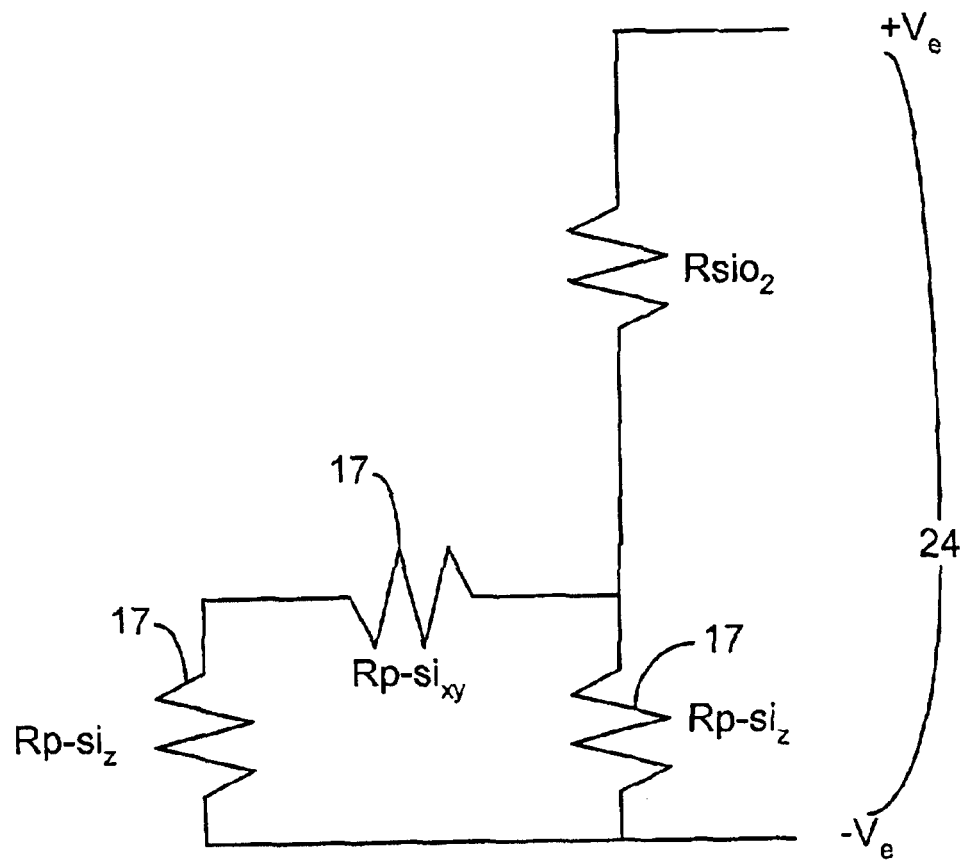

FIG. 7B is a representative schematic of the operation of one emission site in the embodiment shown in FIG. 7A. A pi network of resistors 17, $R_{p\text{-}siz}$ and $R_{p\text{-}sixy}$, represents the resistive layer 55 of FIG. 7 that show the characteristic conductivity of the polycrystalline silicon. $R_{sio2}$ represents the characteristic tunneling resistance for the electrons 16 through the tunneling layer 19. $R_{p\text{-}siz}$ and $R_{p\text{-}sixy}$ represent the distributed resistances within the anisotropic conductivity layer 56. When an emitter voltage 24 is placed across +Ve and −Ve then electrons will begin to flow through $R_{sio2}$ and be emitted. As the emission current increases, the voltage drop across $R_{p\text{-}siz}$ will increase thereby limiting the current through $R_{sio2}$ and also causing the voltage on adjacent emission sites to increase through coupling of $R_{p\text{-}sixy}$, thereby causing their emissions to increase. As the adjacent emissions sites increase their emission current, the current of the present emission site will decrease until substantially a uniform emission over the surface of the emitter is created.

Figure 8A:
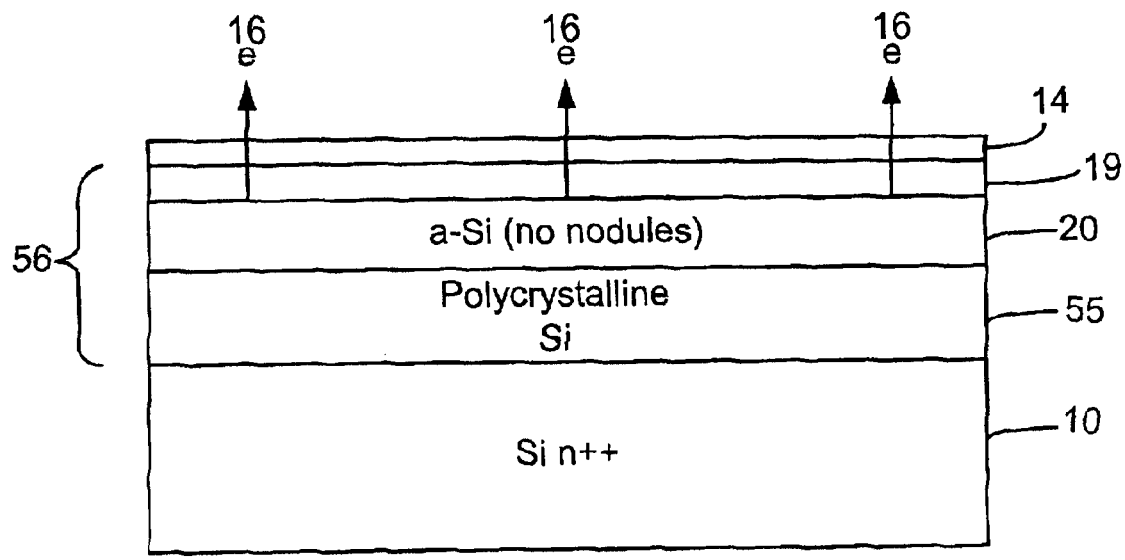

FIG. 8A is an exemplary embodiment of the invention illustrating one method of fabricating the anisotropic conductivity layer. In this embodiment the anisotropic conductivity layer 56 is made up of multiple layers of different types of silicon and a dielectric that are deposited on substrate 10. Substrate 10 is preferably a heavy n++ doped silicon substrate. Deposited on the substrate 10 is a resistive layer 55 made of polycrystalline silicon. Deposited on the resistive layer 55 is a flat layer of amorphous silicon (alpha-silicon, a-Si) that does not include nodules that utilizes tunneling to create emission sites 20. To create the emission sites, a tunneling layer 19 formed of silicon dioxide or other dielectric. Deposited on the tunneling layer 19 is a cathode 14. Electrons 16 are emitted from the top surface of the emitter after tunneling through the tunneling layer 19 with sufficient momentum to escape the cathode 14.

Figure 8B:
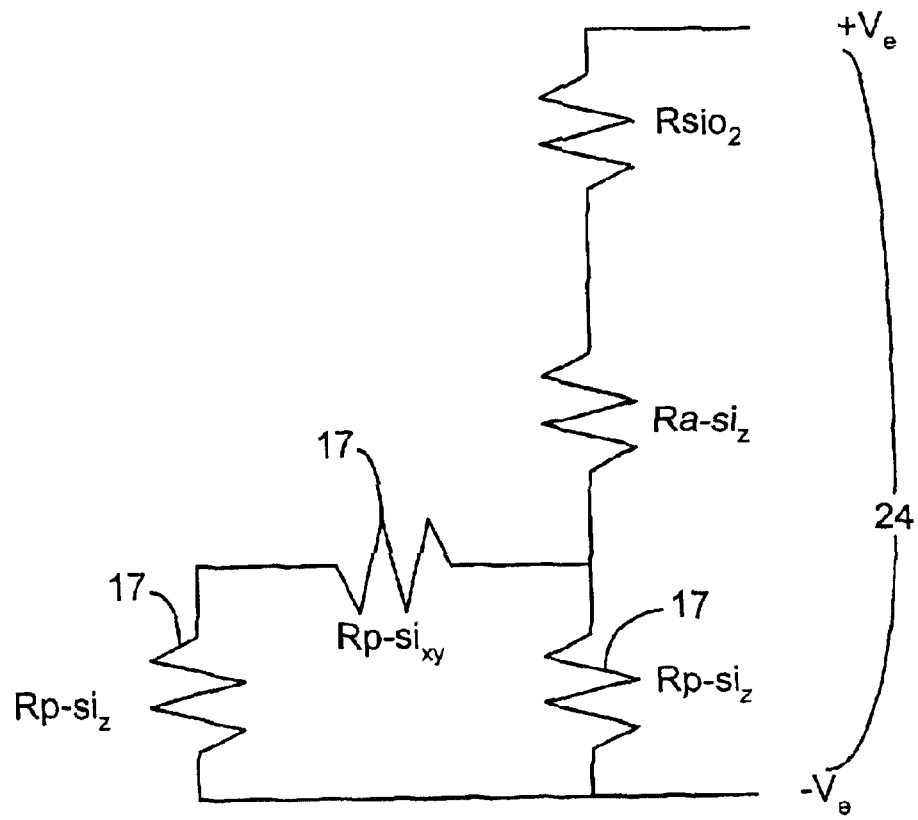

FIG. 8B is a representative schematic of the operation of one emission site in the embodiment shown in FIG. 7. A pi network of resistors 17, $R_{p\text{-}siz}$ and $R_{p\text{-}sixy}$, represents the resistive layer 55 of FIG. 7 that show the characteristic conductivity of the polycrystalline silicon. $R_{a\text{-}siz}$ represents the characteristic resistance in the thickness (z direction) of the a-Si. $R_{sio2}$ represents the characteristic tunneling resistance for the electrons 16 through the tunneling layer 19. When an emitter voltage 24 is placed across +Ve and −Ve then electrons will begin to flow through $R_{a\text{-}siz}$ and $R_{sio2}$ and be emitted. As the emission current increases, the voltage drop across $R_{p\text{-}siz}$ will increase causing the voltage on adjacent emission sites to increase, thereby causing their emissions to increase. As the adjacent emissions sites increase their emission current, the current of the present emission site will decrease until substantially a uniform emission over the surface of the emitter is created.

Figure 9:
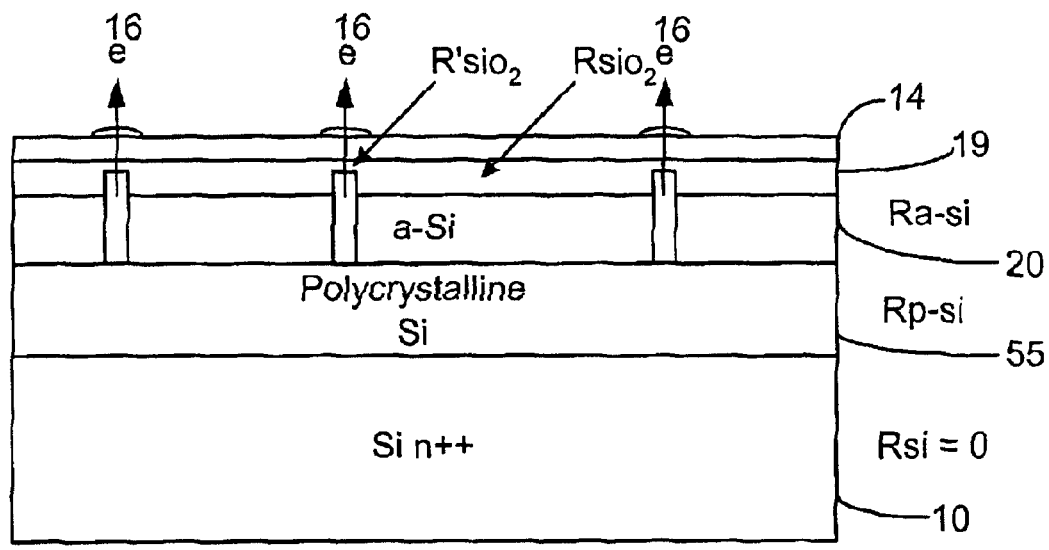
FIG. 9 is an exemplary embodiment of the invention illustrating an alternative method of fabricating the anisotropic conductivity layer.

FIG. 9 is an exemplary embodiment of the invention illustrating an alternative method of fabricating the anisotropic conductivity layer. In this embodiment, substrate 10 is again formed of a heavily n++ doped silicon substrate to create an electron source with essentially an effective resistance $R_{si}$ of zero. As before, a resistive layer 55 of polycrystalline silicon is deposited on the substrate 10. Next a layer of amorphous silicon is deposited as emission sites 20. The layer of amorphous silicon is created such that nodules from the granular crystalline structure of the a-Si are formed to create emission sites. Optionally a tunneling layer 19 is deposited over the a-Si and the emission sites creating at least two regions of oxide tunneling resistance, $R'_{sio2}$ over the emission sites and $R_{sio2}$ over the rest of the plane of the a-Si.

Figure 10:
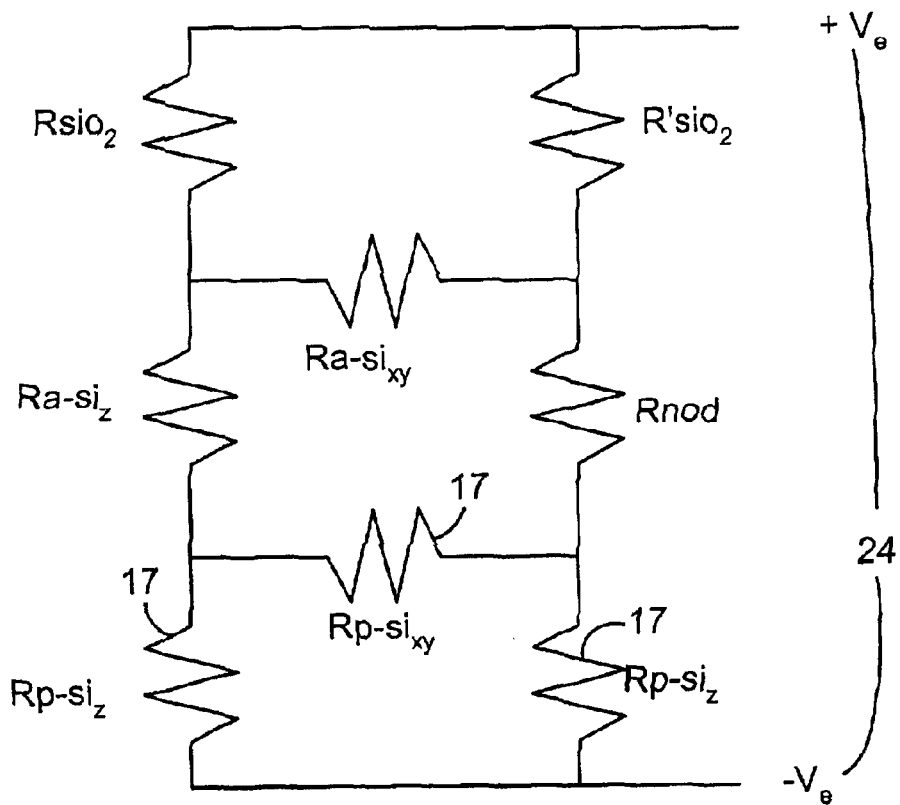
FIG. 10 is a representative schematic of the operation of the embodiment shown in FIG. 9.

FIG. 10 is a representative schematic of the operation a single emission site of the embodiment shown in FIG. 9. As before, the resistive layer 55 is represented by a pi configuration of resistances 17, $R_{p\text{-}siz}$ and $R_{p\text{-}sixy}$, that represent a distributed resistive back layer to form the anisotropic conductivity function. $R_{nod}$ represents the resistance in the z-direction of the nodules formed in the granular a-Si shown in FIG. 9. $R_{a\text{-}sixy}$ and $R_{a\text{-}siz}$ represent the resistance of the a-Si in the xy-direction and the z-direction where there is no nodule, respectively. $R'_{sio2}$ represents the tunneling resistance through the thinner portion of the tunneling layer 19. $R_{sio2}$ represents the tunneling resistance through the thicker portions of the tunneling layer 19. Typically, $R_{sio2}$ is greater than $R'_{sio2}$ by about 2 to about 10 times such that little emission will occur through $R_{sio2}$. Preferably $R_{a\text{-}sixy}$ is about 100 to about 1000 times greater than $R_{nod}$. Further, it is preferable that $R_{p\text{-}si}$ is much less than $R_{a\text{-}si}$. Optionally, the tunneling layer 19 can be removed and a field emission emitter created. However, a higher vacuum environment would be required to prevent the nodules from being damaged by particulates struck by the emitted electrons, ionized, and forcibly attracted back to the nodules.

FIGS. 11A–C are exemplary process steps used to create one embodiment of the anisotropic conductivity layer. In FIG. 11A a template 160 having an array of openings, such as a patterned photomask material, is applied to the surface of a substrate 10. FIG. 11B illustrates the result of filling the template openings with a conductive material and removing the template 160 to create an artificial array of emission sites 20. In FIG. 11C, a layer of resistive material 55 is applied to the substrate 10 and emission sites 20 to fill in between the emission sites 20 and create an anisotropic conductivity layer 56. Optionally a protective dielectric coating can also be applied on top of the resistive material 55 to form a tunneling layer. Also, the final surface may be optionally planarized to create a level surface such as for building a lens structure thereon.

FIGS. 12A–C are exemplary process steps used to create an alternative embodiment of the anisotropic conductivity layer 56. In this embodiment a template 160 having an array of openings, such as a patterned photomask, is formed on the substrate 10. In FIG. 12B, a dopant 162 is implanted and driven into the substrate 10 through the openings in the template 160. In FIG. 12C, the template 160 is removed to reveal the implanted emission sites 164 in substrate 10 thereby creating an anisotropic conductivity layer 56 with the electron source. The resistivity of the substrate 10 provides the anisotropic conductivity layer function and the implanted emission sites 164 form low resistance in the z-direction compared to the bulk resistance of the substrate 10. The doping used, for instance with an n+ substrate, can be either n++ or p+ dopant. If n++ is used, the implanted emission sites 164 will have a lower resistance, and thus a higher conductivity than that found in the bulk of substrate 10. If the dopant is p+ material, a diode is formed for the emission site and it will conduct in the forward direction for an emitter that is properly biased for emitter operation thereby creating a non-linear anisotropic conductivity layer 56.

FIGS. 13A–C are exemplary process steps used to create an alternative embodiment of the anisotropic conductivity layer 56. In this embodiment, a resistive epitaxial layer 166 is deposited or otherwise applied onto the substrate 10. Then as shown in FIG. 13B, a template 160 having an array of openings is applied on the epitaxial layer 166. The epitaxial layer 166 is then doped (preferably implanted and driven in) with either a n+ or p+ material to form low resistance or diode emissive sites 164. In FIG. 13C, the template 160 is removed to reveal the emissive sites 164 surrounded by a resistive back material, resistive epitaxial layer 166.

FIG. 14 is an exemplary fabrication of an anisotropic conductivity layer that incorporates the invention using templated resistive material 161. In this embodiment, a resistive material 168 is deposited and formed, preferably by etching to create columnated structures that are less resistive in the z-direction verses the xy-direction.

FIG. 15 is an alternative exemplary fabrication of an anisotropic conductivity layer 56 that incorporates the invention using material having a self-aligned array. In this embodiment a material having a large granular structure such as polysilicon is deposited on substrate 10 in a thin layer such that the average grain size is approximately equal to the thickness of the deposited material. This will fonn a self-aligned array of emission sites 170 relatively evenly scattered throughout the material. Because the larger grains 171 are fairly conductive compared to the smaller grains in the material, the resistance in the z-direction or thickness will be less than the resistance in the xy-direction or length and width of the deposited material. An exemplary thickness for polysilicon is about 250 Angstroms. Other possible materials beside polysilicon include: silicon nitride doped with tungsten or tantalum; tungsten silicon nitride; titanium oxide; and tantalum oxide. Optionally, by using a thickness of material that is thinner than the average grain size, a nodulated layer can be formed that includes projections for enhancing the electrical field, thereby lowering the turn-on voltage.

FIG. 16 is an alternative exemplary fabrication of an anisotropic conductivity layer 56 that incorporates the invention using an artificially created array 172. In this embodiment, an organized or chaotic array of nodules or Spindt tips are formed from a material either by using an average grain size larger than the thickness of the material or through various known techniques for etching tips in conductive thin films. Optionally, to protect the tips during emission from collisions or wear out, an oxide or other dielectric layer 174 is applied on the surface to cover the tips. This dielectric layer converts the unprotected tips from being a field emission device into a tunneling device as the electrons must tunnel through the dielectric layer. Therefore, the thickness of the oxide between the tips and the ambient vacuum environment preferably are between about 20 to about 500 Angstroms. By varying the dielectric layer 174 thickness, efficiency, lifetime, and vacuum environment pressure levels can be traded off for different applications.

FIG. 17 is an alternative exemplary fabrication of an anisotropic conductivity layer that incorporates the invention using sputtered columns of material within a deposited resistive material 176 on substrate 10. This embodiment takes advantage of the organized crystalline structure formed due to the process used in applying the material to create columns 178 rather than relying on the granular structure of the material itself. By using sputtering or chemical vapor deposition, resistive material 176 such as polysilicon or diamond like carbon will form vertical columns that will have a lower resistance in the z-direction (thickness) than the plane of the material, the xy-direction (length and width of the material).

Figure 18:
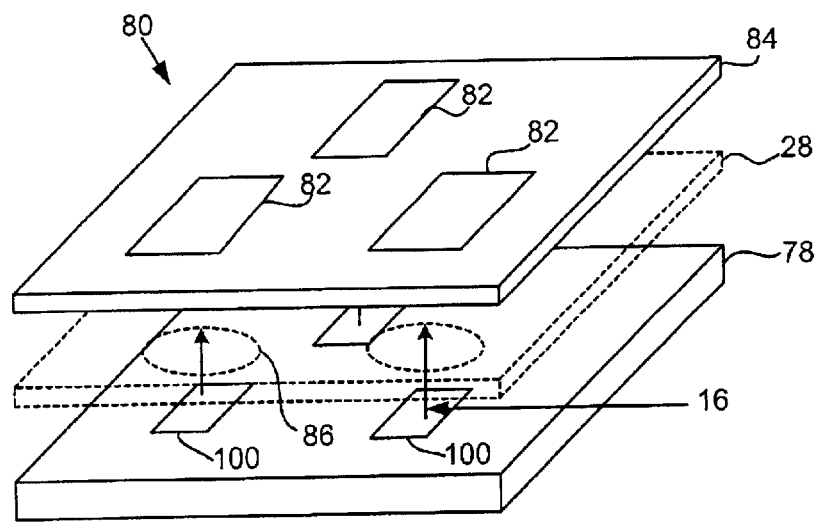
FIG. 18 is an exemplary embodiment of the invention incorporated into a conceptual display device.

FIG. 18 is an alternative embodiment of the invention in a conceptual display 80. The display is made up of preferably an array of pixels 82, which further preferably are arranged in a red, blue, green order but could also be a monochromatic color. The pixels 82 are formed on a display screen 84. An emitter array 78 has one or more integrated electron emitters 100 incorporating the invention, shown as rectangular shaped flat emitters, which are individually controlled to create electron emissions 16. At least one of integrated electron emitters 100 includes an anisotropic conductivity layer to provide uniform electron emissions 16 over the surface of the emitter. The electron emissions 16 are focused using an electron lens 28 preferably made of a conducting layer of material such as aluminum, gold, or other metal or semiconductor thin-films. The electron lens 28 is disposed between the display screen 84 and the emission array 78. Typically, the display screen 84 is held at a voltage potential greater than 500 volts, such as 700 volts for example, to attract the electron emissions 16. The electronic lens 28 has lens openings 86 that focus the electron emissions 16 onto a spot size on pixels 82 on display screen 84. The electron lens 28 is held at a voltage potential relative to the emitter surface, such as a negative 20 volts, to create an electric field around and in the lens opening 86 to create the electronic lens. The difference in voltage potential between the display screen 84 and the emitter array 78 and electronic lens 28 creates an electrostatic attractive force, which causes the display screen 84 to be attracted to the electronic lens 28 and the emitter array 78. To minimize this attractive force, an optional shield layer (not shown) is disposed between the display screen 84 and the electron lens 28. The shield layer has shield openings preferably the same geometry and size as lens opening 86, to allow the electron emissions 16 to pass through the shield layer to the display screen 84.

Figure 19:
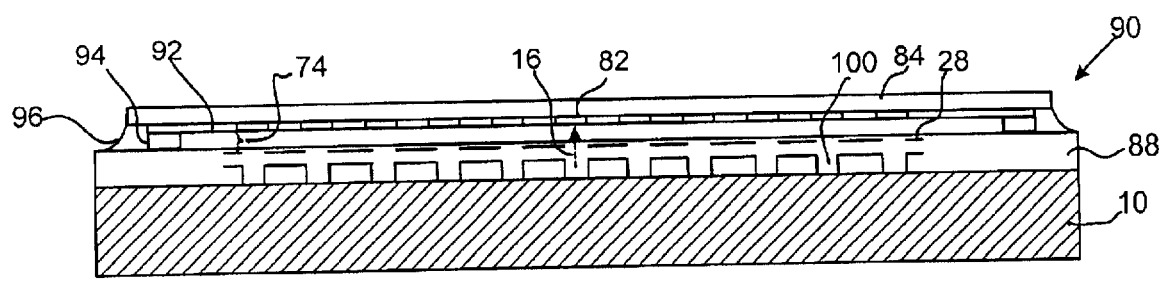
FIG. 19 is an exemplary embodiment of the invention incorporated into an integrated display device.

FIG. 19 is an alternative embodiment of the invention in the form of an integrated display device 90. The integrated display device 90 is formed of a substrate 10, preferably a silicon substrate but optionally another type of semiconductor or alternatively a glass substrate. Several possible substrates of such materials are known to those skilled in the art. The substrate 10 in this exemplary design has a stack of thin-film layers 88 created on the substrate 10. The stack of thin-film layers 88 incorporates preferably an array of integrated emitters 100, incorporating the invention. The integrated emitters 100 are illustrated here as being flat emitters for each pixel phosphor 82, but more than one flat emitter may be present per pixel phosphor 82. Optionally, the integrated emitters 100 may be fabricated using field emission such as with Spindt tips. At least one integrated emitter 100 includes an anisotropic conductivity layer to provide uniform electron emission 16. Each integrated emitter 100 is capable of creating an electron emission 16 that is focused with an electronic lens 28 embedded within the stack of thin-film layers 88 and disposed between the screen anode 92 and the substrate 10. The screen 84 is spaced apart from the stack of thin-film layers 88 by a spacer 94 to an anode-lens distance 74. Spacer 94 is selected and fabricated from several optional materials known to those skilled in the art. Preferably, spacer 94 also provides an airtight seal but optionally, an alternative seal 96 or an adhesive can be applied around the periphery of the integrated display device 90.

FIGS. 20A and 20B are an alternative embodiment of the invention used in a conceptual mass storage device 110. Conceptual mass storage device 110 is exemplarily illustrated as preferably having three different substrates arraigned in a vertical stack. A substrate 10 has a stack of thin-film layers 88 formed on one surface that includes integrated emitters 100 with an electronic lens 28. At least one of the integrated emitters 100 includes an anisotropic conductivity layer for providing uniform electron emissions. The integrated emitters 100 with the electronic lens 28 creates a focused beam 32 that creates a small spot size, preferably less than 40 nanometers such as about 10 nanometers, on a media surface 102 on a rotor substrate 106 disposed between the substrate 10 and a stator substrate 108. The media surface 102 on rotor substrate 108 is preferably made of a phase-change material that is affected by the energy of the focused beam 32. The phase-change material is able to change from a crystalline to an amorphous state 126 by using a high power level of focused beam 32 and rapidly decreasing the power level of focused beam 32. The phase-change material is able to change from an amorphous state 126 to the crystalline state by using a high power lever of focused beam 32 and slowly decreasing the power level so that the media surface has time to anneal to the crystalline state. An exemplary material is germaniun telluride (GeTe) and ternary alloys based on GeTe.

Several other phase-change materials are known to those skilled in the art and can be substituted without departing from the scope and spirit of the invention. Some examples of other preferable phase-change materials are chalcogenide alloys such as: GaSb, InSb, InSe, $Sb_2Te_3$, $Ge_2Sb_2Te_5$, InSbTe, GaSeTe, $SnSb_2Te_4$, InSbGe, AgInSbTe, (GeSn) SbTe, GeSb(SeTe), $Te_{81}Ge_{15}Sb_2S_2$ and GeSbTe.

The rotor substrate 106 and the stator substrate 108 contain electronic circuitry to enable rotor substrate 106 to move in a first and preferably second direction to allow a single integrated emitter 100 to read and write multiple locations on the media surface.

To read from the media surface, a lower-energy focused beam 32 strikes the media surface on media 102 that causes electrons to flow through the media substrate 106 and a reader circuit 104 detects them. The amount of current detected is dependent on the state, amorphous or crystalline, of the media surface struck by the focused beam 32. The operation of an exemplary reader circuit 104 is shown as having a first contact 128 connected to the media surface 102 and a second contact 129 connected to the media substrate 106. Current that flows within the substrate is converted to voltage by amplifier 130 to create a reader output 132. Other reader circuits are known by those skilled in the art and can be substituted without departing from the scope and spirit of the invention.

FIG. 21 is an alternative embodiment of the invention illustrated by an exemplary integrated mass storage device 120. The integrated mass storage device 120 includes three substrates: a substrate 10, a rotor substrate 106, and a stator substrate 108. The rotor substrate 106 has at least one media surface 102 on a portion of the substrate that is able to move in preferably a first and second direction using electrostatic circuits 112, preferably in a step motor type function. The movable media surface 102 is supported by springs 114, preferably formed by etching the rotor substrate. Those skilled in the art are aware of several different micro-mechanical system (MEMs) architectures for fabricating the movable media surface 102.

Electrical contact between the stator substrate 108 and the rotor substrate 106 is performed by contacts 118. Preferably, a bonding seal 116 attaches the rotor substrate 106 to the stator substrate 108 and preferably seals the interior to keep an evacuated environment within the integrated mass storage device 120. Also rotor substrate 106 is attached to substrate 10 using a spacer 124 that is also preferably an airtight seal. Optionally, an alternative seal 122 can be used instead of or in conjunction with spacer 124 to adhere and/or seal substrate 10 to rotor substrate 106.

Substrate 10 includes a stack of thin-film layers 88 that are preferably applied using conventional semiconductor processes. The stack of thin-film layers 88 include a set of integrated emitters 100 incorporating the invention that are focused using an electronic lens 28 that creates an electric field 34 that creates the focused beam 32 on the media surface 102 to a spot size of preferably less than 40 nanometers and more preferably less than 10 nanometers. The electronic lens 28 preferably has a lens opening of about 7.2 micrometers. Preferably the space between the substrate 10 and the rotor substrate 106 is evacuated of air to preferably less the $10^{-3}$ Torr to prevent the electrons emitted from the integrated emitters 100 from colliding with gas or other particles which could damage the integrated emitters 100. The integrated emitters 100 are held at a first voltage potential to create the electrons preferably by tunneling or field emissions techniques. The first voltage potential is preferably less than about 25 volts. The electronic lens 28 is held at a second voltage potential, preferably about 0 volts with respect to ground to create the electric field 34 used for focusing the electrons. The media surface 102 is preferably held to a third potential preferably greater than 500 volts, for example about 700 volts, to attract the electrons emitted from the integrated emitters 100. Preferably, the electronic lens 28 is separated from the integrated emitters 100 by a first distance, for example about 5 micrometers. At least one of the integrated emitters 100 includes an anisotropic conductivity layer to provide for uniform electron emission from the emitter.

Figure 22:
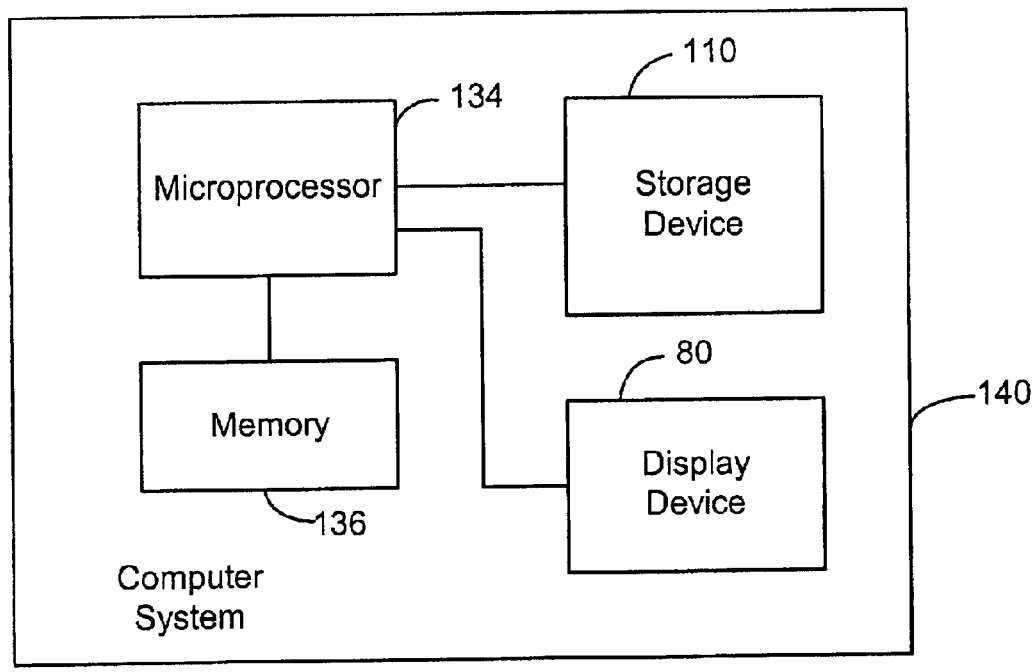
FIG. 22 is a block diagram of an electronic device, a computer system that incorporates at least one embodiment of the invention.

FIG. 22 is an exemplary block diagram of an electronic device 140, such as a computer system, video game, Internet appliance, terminal, MP3 player, or personal data assistant to name just a few. The electronic device 140 includes a microprocessor 134, such as an Intel Pentium Processor™ or compatible processor although other processors exist and are known to those skilled in the art. The microprocessor 134 is connected to a memory device 136 that includes computer readable memory that is capable of holding computer executable commands used by the microprocessor 134 to control data and/or input/output functions. Memory 136 can also store data that is manipulated by the microprocessor 134. The microprocessor 134 is also connected to either a storage device 110 or display device 80 or both. The storage device 110 and the display device 80 contain an embodiment of the invention as exemplified in earlier described figures and text showing field or tunneling emission devices that are focused and preferably shielded with the lens structure forming an integrated emitter. At least one of the integrated emitters includes an anisotropic conductivity layer to provide for uniform electron emission from the emitter.

Figure 23:
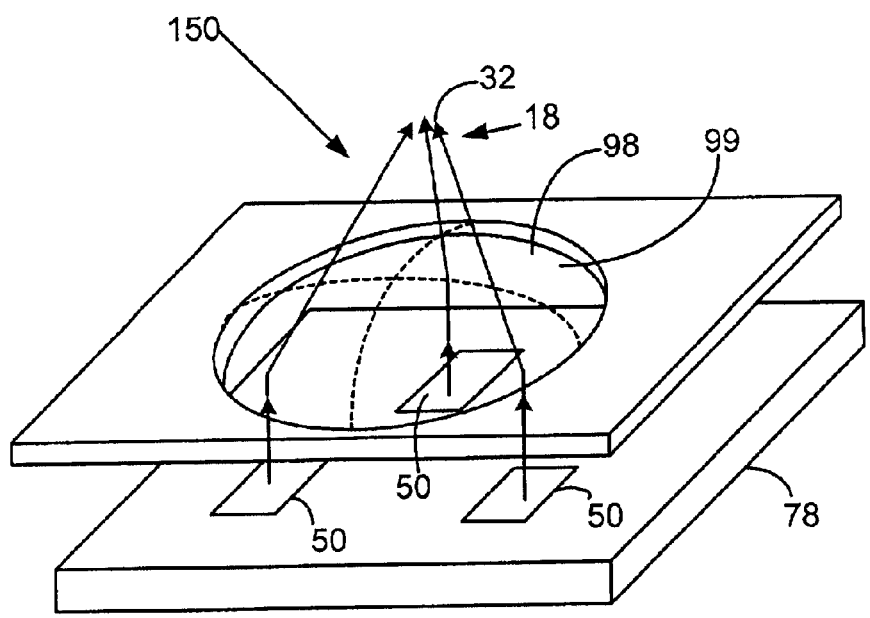
FIG. 23 is an exemplary embodiment of the invention incorporated into an optical display device.

FIG. 23 is an alternative embodiment of the invention illustrating an optical display device 150 that uses an emitter array 78 of either emitters 50 or optionally integrated emitters 100 to form an image that is focused using an optical lens 98 to create a focused beam 32. The emitters 50 create photons 18 and also electrons 16 (not shown). At least one of the emitters 50 or integrated emitters 100 includes an anisotropic conductivity layer to provide for uniform electron emission from the emitter.

A transparent conductor 99 such as indium tin oxide is deposited on the side of the optical lens 98 that faces the emitters 50 to capture the emitted electrons. The purpose of the transparent conductor 99 is to allow the photons 18 to pass through while preventing the electrons emitted from gathering on the lens and creating a high electrostatic field.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. An emitter, comprising:
    an electron source;
    a cathode having an emissive surface; and
    a continuous anisotropic conductivity layer disposed between the electron source and the emissive surface of the cathode wherein the anisotropic conductivity layer has an anisotropic sheet resistivity profile;
    a tunneling layer disposed between the anisotropic conductivity layer and the cathode; and
    an emissive layer disposed between the tunneling layer and the anisotropic conductivity layer.

2. An emitter, comprising:
    an electron source;
    a cathode having an emissive surface; and
    a continuous anisotropic conductivity layer disposed between the electron source and the emissive surface of the cathode wherein the anisotropic conductivity layer has an anisotropic sheet resistance profile wherein the sheet resistivity of the ansotropic conductivity layer in the thickness direction is less than the sheet resistivity of the ansotropic conductivity layer in the length and width directions by atleast 2 times, and wherein the sheet resistivity of the anisotropic conductivity layer in the thickness direction is about $1 \times 10^7$ to about $1 \times 10^{10}$ ohm centimeters.

3. An emitter, comprising:
    an electron source;
    a cathode having an emissive surface; and
    a continuous anisotropic conductivity layer disposed between the electron source and the emissive surface of the cathode wherein the anisotropic conductivity layer has an anisotropic sheet resistivity profile wherein the anisotropic conductivity layer is formed with a columnar structure.

4. The emitter of claim 3 wherein the columnar structure is formed by sputtering a resistive material.

5. The emitter of claim 4 wherein the resistive material is silicon.

6. The emitter of claim 4 wherein the resistive material is diamond-like carbon.

7. An emitter, comprising:

an electron source;

a cathode having an emissive surface; and a continuous anisotropic conductivity layer disposed between the electron source and the emissive surface of the cathode wherein the anisotropic conductivity layer has an anisotropic sheet resistivity profile wherein the anisotropic conductivity layer comprises a plurality of pn junctions interconnected by a resistive material.

* * * * *